Patented May 19, 1925.

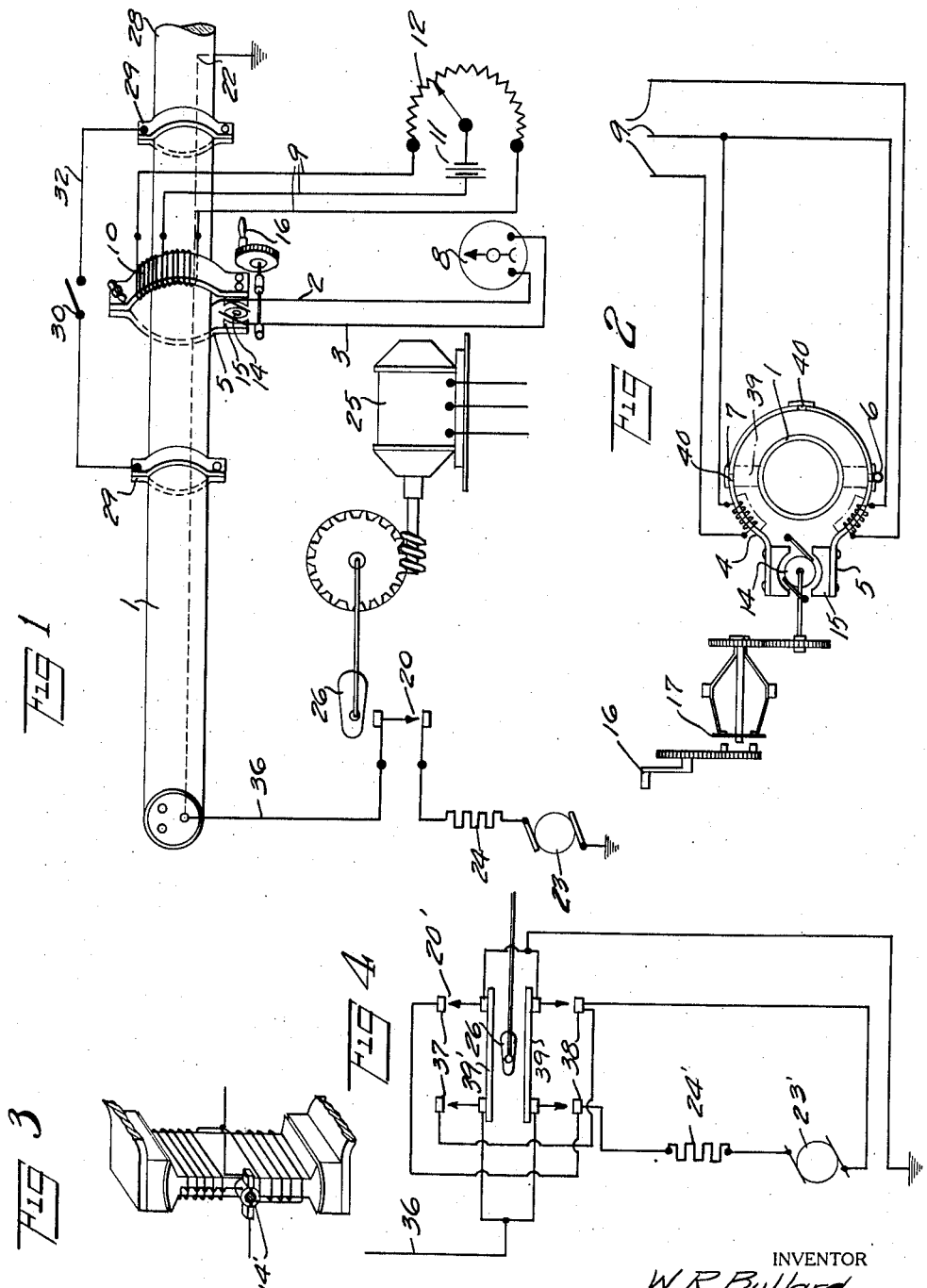

1,538,383

UNITED STATES PATENT OFFICE.

WILLIAM RALPH BULLARD, OF NEW YORK, N. Y.

METHOD AND APPARATUS FOR LOCATING FAULTS IN ELECTRICAL CABLE SYSTEMS.

Original application filed November 25, 1922, Serial No. 603,318. Divided and this application filed November 14, 1923. Serial No. 674,624.

*To all whom it may concern:*

Be it known that I, WILLIAM RALPH BULLARD, a citizen of the United States of America, residing at 63 West 183rd Street, in the county of Bronx, city and State of New York, have invented Methods and Apparatus for Locating Faults in Electrical Cable Systems, of which the following is a specification.

This application relates to a novel method and system or apparatus for detecting the presence of currents flowing in electrical transmission cables and locating faults therein.

This application is a division of my application Serial No. 603,318, filed November 25, 1922.

The object of my invention generally is to obviate certain defects and inaccuracies of the prior systems for locating faults, and particularly a novel method and system which may be used supplementary to or independently of other systems in vogue to locate the faults with greater accuracy and certainty than has hitherto been possible.

For a better understanding of the novel features and principle of my invention and the best mode or modes in which I contemplate applying the same, reference may be had to the accompanying drawings wherein—

Fig. 1 is a diagrammatic view illustrating one embodiment of the fault locating system;

Fig. 2 is a view illustrating in more detail the generator field circuit;

Fig. 3 is a view illustrating further details of the generator, and

Fig. 4 illustrates a modified interrupting switch.

The drawings present more or less diagrammatically the preferred embodiment of my perfected method and system for locating faults in cables, the perfected method and system having been arrived at after extended experiments with various alternative arrangements. This method consists generally in supplying intermittently and periodically a direct current, herein called the tracing current, through the faulty cable and causing it to pass outwardly through the fault or ground, and approximating the relative position of the fault by applying to the cable at points removed from the point of application of the tracing current a detector (for example, similar to that illustrated in Fig. 1) which is responsive to the periodic tracing current. Ordinarily the fault or ground may be quite accurately located by comparatively few eliminating tests. As it is only necessary to detect the absence or presence of the tracing current any suitable detecting element may be used in the place of the measuring instrument 8 illustrated in Fig. 1, such for example as a sound or telephone detector which I have found by experiment to give fair results in certain cases. In this case the armature 14 will be provided with collecting rings instead of a commutator.

According to prior methods either an alternating or rapidly pulsating current has been used as the tracing current with audible indicating apparatus, or else direct current with a crude method of indication such as a compass held in the vicinity of the cable. My invention has the advantages of great sensitivity, comparative freedom from disturbance due to external fields, visual indication (which is much more reliable than audible indication) and other advantages which will be described hereinafter.

Methods using alternating or rapidly pulsating current are unreliable unless the fault has practically zero resistance to ground, for if the fault has resistance then an alternating or pulsating potential will exist between the cable conductor and ground, causing current to flow beyond the fault due to cable capacity, thereby giving false indication. The use of direct current eliminates this effect and renders the indication reliable.

Another difficulty which is often encountered in locating faults by prior methods is the fact that sometimes the tracing current does not pass directly into the ground at the fault but travels for some distance along the cable sheath (when the cable has a metallic sheath) in either or both directions from the fault before passing into the ground. Such conditions can be readily detected by the use of my invention.

Referring to Fig. 1, my system or apparatus includes a generator 5 which is adapted to be connected to a detecting or measuring device 8 and whose field poles are excited by the magnetism set up by the current flowing in a conductor 1, the construction and arrangement being such, as hereinafter set forth, that when the generator 5 is mechanically operated or rotated the current or E. M. F. generated and indicated by the instrument 8 is substantially proportional to the volume of current flowing in the conductor 1. 4 is a ring or magnetic circuit of soft iron which forms the field of the generator 5. 4 is in two parts, these parts being joined by a hinge at 6 and provided with a catch or clasp at 7. The object of this construction is to permit encircling the cable, 1, with the field 4 without breaking the continuity of the cable. The generator 5 may be designed to furnish either alternating or rectified current at its terminals. This current is carried by small conductors 2, 3 to the measuring instrument 8 which may be of the moving coil galvanometer type in case rectified current is furnished at the terminals of the generator 5. The coils 10 are in magnetic relationship with the field 4 and are supplied with current from the battery 11 through the rheostat 12 and connections 9. The circuit arrangement and the relationship of these coils are such that the resultant magnetism of both coils can be varied continuously from a maximum in one direction to a maximum in the opposite direction by adjusting the rheostat 12. When not in use the battery circuit is broken in the usual manner. The generator 5 is provided with some means of revolving the armature 14 between the pole pieces, 15. This may be a hand operated crank 16 or any other suitable source of mechanical power. A constant speed clutch 17 may be provided, if desired, for keeping the speed of the armature approximately constant with varying speeds at the crank 16.

It is assumed for illustrative purposes that the cable has a fault at 22 which fault is caused because of the connection of one or more conductors to ground. 23 is a generator or source of direct current supply, the current from which is limited or controlled in any suitable manner, as by a variable resistance 24 in series with the armature. 25 is a small constant speed motor (indicated as an induction motor) operating a mechanical device 26 and switch 20 which will periodically open and close the direct current supply from the generator 23. The direct current from the generator is applied to the faulty conductor or conductors at one end of the cable, the other terminal of the generator being grounded.

The current thus passes through the cable to the fault, through the fault to ground and thence through the ground back to the generator.

The hand generator 5 is moved from one location to another along the cable and by embracing the cable with it at each location it enables the detection of the presence or absence of the direct or tracing current flowing through the cable to the fault. This is done by rotating the armature by a crank or other means and noting the deflection of the current detecting instrument 8. The purpose of the interrupter 20 in the D. C. circuit is to enable the operator of the device to distinguish between the current flowing through the cable to the fault, and any stray current which may be flowing in the sheath of the cable. The period of interruption is preferably very slow, as for example one second on and one second off, which is found to reduce the capacity effect to a negligible quantity. Another disturbing influence may be current flowing in the vicinity of the instrument which may give a sufficiently powerful field to affect the indication.

It can readily be seen that in order to locate the fault it is only necessary to take readings at a sufficient number of points along the cable. When the point 28 is reached there will be no deflection of the instrument 8, indicating that the fault has been passed.

In locating faults in cables having metallic sheaths it is sometimes desirable for more accurate work to devise some means for eliminating or minimizinz the effect of sheath currents on the detecting apparatus and then take successive readings on the instrument 8 with the effect of the sheath E. M. F. or current thereon modified in amount for comparative purposes. I will now describe an effective method of accomplishing this.

Referring again to Fig. 1, 32 represents a conductor of low resistance which can be readily connected to the cable sheath by the clamps 29 for forming a low resistance path for sheath current around the detecting instrument 5. The switch 30 is inserted in this circuit. The method of using this arrangement is as follows: A reading is taken at the instrument 8 with the switch 30 open, giving a periodic deflection due to the current supplied to the cable from the generator 23. A second reading is taken with the switch 30 closed and it is noted whether the deflection in this case is more or less than with the switch 30 open. If it is more the instrument 5 is indicating the difference between conductor current and sheath current and is located between the source of supply 23 and the fault 22. If it is less the instrument is indicating sheath current only and is located at a point on the cable beyond the fault. This method usually need only be used after the fault has been localized in a comparatively small portion of the cable by using the instrument 5 without the shunting conductor 32. The latter is then used in the final tests to determine the exact location of the fault.

When the fault has been located in this manner, a final and accurate check on what has been determined can be effected by entirely eliminating the sheath current by cutting rings out of the sheath on opposite sides of the place where the fault has been located, it being possible to replace the lead sheath without disturbing the insulation or making a new joint in case there was an error in the location, and if there was no error then only the faulty section has been cut.

If the fault should consist of a breakdown of insulation between two or more conductors and not between any one conductor and the sheath or ground, this device can be used to locate a fault of this kind in the manner described above except that the generator 23 has its terminals connected to the faulty conductors and that in this case the cable is not completely encircled by the field circuit. Instead the field circuit is opened sufficiently so that the cable can be placed just half way within the gap at the opening of the field. The device is then swung radially around the cable until the point of maximum deflection is found.

The sensitivity of the device is limited only by the design of the instrument 5 and that of the detecting instrument 8. The combination can be easily constructed to indicate the presence of direct current of the order of a small fraction of an ampere. In practice a limitation is imposed by the disturbing effects of stray fields and stray currents in the sheath. If these fields or currents are constant then they can be eliminated by means of the neutralizing circuit 9. In using the neutralizing device, the procedure is to close the circuit of battery 11 and turn the crank before the field 4 has been clamped or positioned around the cable and then to adjust the variable resistance until the detecting or indicating instrument 8 reads zero or substantially so. With this adjustment made, the field 4 is positioned around the cable and another reading then taken with the tracing current flowing through the fault. The instrument should then indicate correctly the presence of tracing current flowing past the generator. If the stray fields or currents are varying with variations giving deflections of the instrument 8 less than those due to the tracing current their presence is not important. However, if the disturbing variations in the deflection of the instrument 8 are larger than those due to the tracing current it may become impossible to distinguish between tracing current and the stray fields, or currents without modifying the application of this device. Nevertheless my invention affords a ready means of overcoming these difficulties and eliminating these disturbing effects. The method by which this can be accomplished is as follows—

Instead of using an ordinary damped measuring instrument for the element 8 an undamped instrument is used. This instrument will therefore have a natural period of oscillation. This period should preferably be adjustable. Now by making the period of the interrupter 26 equal to that of the instrument 8, the periodic deflection of the latter can be multiplied many times thereby minimizing the effect of disturbing variations of stray fields or currents and enabling the operator of the device to readily distinguish between the deflection due to these and that due to the tracing current.

The period of the instrument may be adjusted by changing the length of the spring or by adjusting the weights toward or away from the pivot of the moving element or by some other similar means. Constant speed for the interruption may be obtained by using a synchronous motor drive.

The indications of the instrument may be further amplified by replacing the interrupter 26 with a reversing switch which will reverse the tracing current on the instrument and thereby render the detecting apparatus more sensitive. Such a reversing switch is indicated diagrammatically in Fig. 4 at 20' wherein the supply circuit including the generator 23' and the variable resistance element 24' is periodically connected with the cable and the ground so as to reverse the polarity of the current thereto at each make and break of the interrupter 26, the ground connection being illustrated conventionally and the circuit leading to the cable 1 being indicated at 36. The connections are similar to the usual connections of a double pole double throw reversing switch, the supply circuit being reversibly connected with the upper and lower sets of contacts 37 and 38 and the receiving circuit being connected, as indicated, with the upper and lower switch elements 38 and 39 so that reverse polarities are obtained by closing the switch elements alternately.

The instrument 8 preferably has its zero point in the center of the scale, and the neutralizing rheostat is adjusted to bring the average indication of the needle in the neighborhood of the zero point when the normal tracing current is flowing.

In the case of direct current power circuits, it is not usually practicable to make any test for detecting faults while any substantial power current is flowing because of the tendency of the magnetism produced by the power current to overpower any tracing current in magnetizing the field of the generator. In the case of alternating power circuits, however, it is ordinarily practicable to detect the fault in the manner herein described, notwithstanding that large power currents are flowing; but in testing for faults on such circuits it is important that the field of the generator 5 surrounds all the conductors in order to avoid errors due to the passage of tracing current through transformers or other apparatus connected to the circuit.

The armature 14 may be equipped with a two segment commutator 14' thereby giving a pulsating unidirectional current through the instrument and these segments may be, if desired, of a large diameter as compared to the width of brush surface, thereby to minimize the effect of changes in radial position with respect to the axis of the pole pieces of the generator. This has the further advantage that within certain ranges an increase of surface speed at the commutator tends to steady the contact resistance. The effect of varying contact resistance may be minimized by making the impedance of the total meter circuit high as compared to the contact resistance. These refinements in accuracy of measurement and others including a high armature reactance compared to the resistance of instrument 8, the governor type speed regulator 17, and the non-magnetic gaps 40 in the field circuit 4 with the field having a substantially larger diameter than the cable and spaced therefrom by means of the spacers 39 and more particlularly set forth in the aforesaid application which is directed to the measurement of the volume of current flowing.

I claim:

1. The method of locating faults in cables, which consists in causing a slowly varying unidirectional current to pass through the faulty cable, causing magnetism produced by said current to excite the field magnet of a generator detector first at one point along the cable and then at another, and noting the presence or absence of the generated current at different points along the cable.

2. The method of locating faults in cables which consists in supplying intermittently through the cable at definite prolonged intervals a unidirectional current and causing it to pass out through the faulty portion of the cable and positioning an electric generator with its field magnetically associated with the cable at different points thereof for testing for the magnetic fields set up about the cable corresponding to the intermittent unidirectional current passing therethrough.

3. The method of locating faults in cables which consists in supplying intermittently through the faulty cable at definite prolonged intervals a unidirectional current and causing it to pass out the faulty point of the cable and positioning an electric generator at different points along the suspected cable with its field magnetically associated with the field set up about the cable by the unidirectional current and detecting the character of the magnetic field about the cable by the character of the currents generated by the generator when operated.

4. The method of locating faults in a faulty cable which consists in connecting therewith a direct current source with one side connected to the cable and the other side connected to the ground and intermittently interrupting the direct current supply circuit at definitely controlled intervals and positioning a mechanically operated generator at different points throughout the cable with its field magnetically associated with the fields set up by the cable and thereby causing the generator to respond to the presence of the magnetic fields set up about the cable by the intermittent unidirectional current when the generator is at a point past which the intermittent unidirectional current flows in the cable.

5. The method of locating grounds in a metallic sheath cable which consists in supplying to the faulty cable a varying unidirectional current and causing it to pass out through the faulty point of the cable to set up about the cable a magnetic field corresponding to the varying unidirectional current, positioning an electric generator at a point removed from the point of application of the unidirectional current to the cable with the field of the generator magnetically associated with the cable whereby the generator is caused to generate a current responsive to the magnetic field about the cable at that point, and placing a short circuiting shunt about the point of application of the generator and taking readings of the generator with this shunt both open and closed.

6. In a system for locating a fault in a cable, the combination of a magnetic path or circuit, means for opening and closing the magnetic circuit so as to surround a cable or conductor carrying direct current with said magnetic circuits, a revoluble armature adjacent to and in magnetic relation with said magnetic circuit, means for revolving said armature, a detecting device connected to said armature, means for circulating direct current through the cable or conductor to a fault existing in said cable or conductor, and means for periodically interrupting this direct current.

7. In a system for locating a fault in a cable, the combination of a magnetic path or circuit of suitable reluctance, means for mechanically surrounding a cable or conductor with said magnetic path, a separate electric circuit adjacent to and in magnetic connection with the magnetic path, a source of direct current supply connected to said separate electric circuit and means for varying the current flowing in this circuit, a revoluble armature adjacent to and forming a part of the magnetic circuit, means for revolving the said armature, a detecting device connected to said armature, means for circulating direct current through the conductor or cable to a fault which may exist on this conductor or cable, and means for periodically interrupting this direct current.

8. In a system for locating a fault in a cable, the combination of a magnetic path or circuit of low reluctance, means for opening and closing the magnetic circuit so as to surround a cable or conductor with said magnetic circuit, a revoluble armature adjacent to and in magnetic relation with said magnetic circuit, means for revolving said armature, an indicating device, having a free natural period of oscillation, and connected to said armature, means for circulating direct current through the cable or conductor to a fault which may exist on said cable or conductor, and means for periodically interrupting this direct current with a period corresponding to the natural period of the indicating device.

9. In a system for locating a fault in a cable, the combination of a magnetic path or circuit of low reluctance, means for mechanically surrounding a cable or conductor carrying direct current with the magnetic path without breaking the continuity of the direct current circuit, a separate electric circuit adjacent to and in magnetic connection with magnetic path, a source of direct current supply connected to said separate electric circuit and means for varying the current flowing in this circuit, a revoluble armature adjacent to and forming a part of the magnetic circuit, means for revolving said armature, an indicating device, having a free natural period of oscillation connected to said armature, means for circulating direct current through the cable or conductor to a fault which may exist on said cable or conductor, and means for periodically interrupting this direct current with a period corresponding to the natural period of the indicating instrument.

10. The method of locating a fault in a metallic sheath cable which consists in passing through the faulty cable an intermittent tracing current, positioning a device responsive to the magnetism set up by the tracing current at a point removed from the point of application of the intermittent tracing current, and then observing successive responses on the device with the effect of the sheath current thereon modified in amount by alternately connecting and disconnecting a sheath shunt about the responsive device.

11. The method of locating a fault in a metallic sheath cable which consists in passing through the faulty cable a slowly varying unidirectional current, positioning a device responsive to the magnetism set up by the tracing current at different points along the faulty cable and then with the sheath current alternately shunted past and away from the responsive device, taking successive readings thereon to obesrve the effect of the sheath current thereupon.

12. The method of locating grounds in a metallic sheath cable which consists in supplying to the faulty cable a varying unidirectional current and causing it to pass out through the faulty point of the cable to set up about the cable a magnetic field corresponding to the varying unidirectional current, positioning a device at different points along the faulty cable which is responsive to the tracing current and the sheath current, placing a short-circuiting shunt about the point of application of the responsive device and then observing the response thereon with the shunt both open and closed.

13. The method of locating faults in cables which consists in supplying intermittently through the cable at definite prolonged intervals, and with a reversed polarity at each successive interval, a unidirectional current and causing it to pass out through the faulty portion of the cable and positioning an electric generator with its field magnetically associated with the cable at different points thereof for testing for the magnetic fields set up about the cable corresponding to the intermittent unidirectional current passing therethrough.

In testimony whereof, I have signed my name to this specification.

WILLIAM RALPH BULLARD.